United States Patent
Buhler et al.

(10) Patent No.: US 7,633,201 B2
(45) Date of Patent: Dec. 15, 2009

(54) MAGNETIC BEARING DEVICE AND VACUUM PUMP

(75) Inventors: Philipp Buhler, Zürich (CH); Rene Larsonneur, Winterthur (CH)

(73) Assignee: Mecos Traxler AG, Winterhur (CH)

( * ) Notice: Subject to any disclaimer, the term of this patent is extended or adjusted under 35 U.S.C. 154(b) by 477 days.

(21) Appl. No.: 10/572,358

(22) PCT Filed: Sep. 2, 2004

(86) PCT No.: PCT/CH2004/000553

§ 371 (c)(1),
(2), (4) Date: Mar. 16, 2006

(87) PCT Pub. No.: WO2005/026557

PCT Pub. Date: Mar. 24, 2005

(65) Prior Publication Data

US 2007/0024138 A1    Feb. 1, 2007

(30) Foreign Application Priority Data

Sep. 17, 2003    (EP)    ................... 03405681

(51) Int. Cl.
  *H02K 7/09*    (2006.01)
(52) U.S. Cl. .................... 310/90.5; 310/68 B
(58) Field of Classification Search ............. 310/68 B, 310/71, 90.5
See application file for complete search history.

(56) References Cited

U.S. PATENT DOCUMENTS

| 5,397,212 | A  | * | 3/1995 | Watanabe et al. | ........ 414/744.6 |
| 5,783,887 | A  | * | 7/1998 | Ueyama et al. | ............. 310/90.5 |
| 6,184,640 | B1 | * | 2/2001 | Kawashima | ................. 318/461 |
| 6,380,652 | B1 | * | 4/2002 | Ueyama et al. | ............. 310/90.5 |
| 6,606,536 | B1 | * | 8/2003 | Aso | ........................... 700/174 |
| 6,617,734 | B2 | * | 9/2003 | Taniguchi et al. | .......... 310/90.5 |
| 6,949,853 | B2 | * | 9/2005 | Kawashima | ................ 310/90.5 |
| 6,984,907 | B2 | * | 1/2006 | Barada | ...................... 310/90.5 |
| 2002/0096824 | A1 |  | 7/2002 | Forch et al. | |
| 2003/0155829 | A1 |  | 8/2003 | McMullen et al. | |

FOREIGN PATENT DOCUMENTS

EP    1 041 288 A2    10/2000

* cited by examiner

*Primary Examiner*—Thanh Lam
(74) *Attorney, Agent, or Firm*—Browdy and Neimark, PLLC

(57) ABSTRACT

A magnetic bearing device (1) for rotatably supporting a shaft (20) for rotation about a rotation axis (101) is disclosed. The device (1) comprises a first active radial bearing (5), one or more first radial displacement sensors (81), and an axial bearing (6, 7). At least a part of the axial bearing (6, 7) is disposed between the first active radial bearing (5) and the first radial displacement sensors (81) when viewed in an orthogonal projection onto the rotation axis (101). A vacuum pump including the magnetic bearing device (1) and a multiple-sensing unit (8) are also disclosed.

11 Claims, 7 Drawing Sheets

MAGNETIC BEARING DEVICE AND VACUUM PUMP

TECHNICAL FIELD

The present invention relates to a magnetic bearing device and to a vacuum pump comprising such a magnetic bearing device, in particular to a turbo-molecular vacuum pump (TMP).

BACKGROUND OF THE INVENTION

In a turbo-molecular vacuum pump, a rotor with attached pump blades rotates at a high angular velocity. In order to make this rotation as loss- and wear-free as possible, often magnetic bearings are employed for supporting the rotor in a non-contacting manner. The magnetic bearings can be passive, employing permanent magnets, or active, employing electromagnets of various kinds. Also combinations of passive and active bearings, as well as combinations of magnetic bearings with standard ball bearings and/or air bearings are known in the art.

The rotor essentially constitutes a rigid top having six spatial degrees of freedom (DOF). One DOF is the rotation around the rotor axis. This DOF is usually driven by an electromotor. The other five degrees of freedom should be essentially fixed. Therefore, bearings are needed to restrain motions along these degrees of freedom.

Generally, TMPs can be operated in any orientation, i.e., the rotor axis can have any arbitrary direction in space. In the following, it is assumed for simplicity that the rotor axis is vertical and that the rotor is supported in the bearing stators by an elongated shaft of cylindrical symmetry carrying the rotor counterparts of the stators. Then the necessary restraints of the degrees of freedom are usually achieved by providing a set of upper radial bearings restraining radial motions of an upper portion of the shaft in two mutually perpendicular radial directions, a set of lower radial bearings restraining radial motions of a lower portion of the shaft in two mutually perpendicular radial directions, and a set of axial bearings (often called thrust bearings) restraining axial motions of the shaft. This provides control over five degrees of freedom.

All or only part of these bearings may be active bearings. In order to control the active bearings, sensors are needed that determine the displacement of the shaft from its ideal position along particular directions. Such sensors are well known in the art.

Normally, the sensors, the bearings, and the drive motor are arranged together to form a bearing device. The arrangement of components of the bearing device is usually in a particular order. Starting on the upper end of the device, i.e., on the end where the pump rotor with blades is mounted, the order is usually from top to bottom as follows:
a. Upper radial sensor
b. Upper radial bearing
c. Drive motor
d. Lower radial bearing
e. Lower radial sensor
f. Axial bearing
g. Axial sensor The axial sensor is usually mounted below the lower end of the shaft. Furthermore, additional sensors may be present, e.g., for monitoring the rotation frequency. Such an arrangement is disclosed, e.g., in U.S. Pat. No. 6,465,924 to Maejima (see, e.g., FIG. 5 of that document).

However, such an arrangement leads to relatively large lengths of the bearing device and, consequently, of the shaft. Furthermore, sensors are present in at least three planes along the axis, which makes cabling complex and expensive. Due to the large length of the shaft, moments of force are rather large, necessitating strong bearings. Moreover, long shafts tend to have low bending eigenfrequencies, hampering magnetic bearing control. Finally, a TMP length as short as possible is desirable for the end user.

US Patent Application Publication No. 2003/0155829 discloses a magnetic bearing device having a single thrust disk that is reacted against for both radial and axial displacements. While this design leads to a short device length, it offers active control of only three degrees of freedom.

SUMMARY OF THE INVENTION

It is therefore an object of the present invention to provide a magnetic bearing device with reduced length and of a simplified construction.

This object is achieved by a magnetic bearing device for rotatably supporting a rotor for rotation about a rotation axis the magnetic bearing device comprising a first active radial bearing, one or more first radial displacement sensors, and an axial bearing, characterized in that at least a part of the axial bearing is disposed between the first active radial bearing and the first radial displacement sensors if viewed in an orthogonal projection onto the rotation axis. The magnetic bearing device comprises a first active radial bearing, one or more first radial displacement sensors, and an axial bearing. According to the invention, at least a part of the axial bearing is disposed between the first active radial bearing and the first radial displacement sensors if viewed in an orthogonal projection onto the rotation axis.

Advantageously, the magnetic bearing device additionally comprises a second active radial bearing. The first and second radial bearings are disposed in different positions along the rotation axis. The second radial bearing is advantageously disposed on the same side of the axial bearing as the first radial bearing if viewed in an orthogonal projection onto the rotation axis. In other words, the first radial bearing is advantageously disposed between the axial bearing and the second radial bearing.

Advantageously, the device further comprises second radial displacement sensors. Also the first and second radial displacement sensors are disposed in different positions along the rotation axis. Such a device enables active control of five degrees of freedom.

Here, the orthogonal projection is defined as a projection by rays directed radially onto the rotation axis. In other words, the axial bearing, the first active radial bearing, and the first radial displacement sensors are arranged in the following way: If all planes which are orthogonal to the rotation axis and which intersect with the first active radial bearing are taken, and all planes which are orthogonal to the rotation axis and which intersect with the first radial displacement sensors are taken, then always a plane can be found which is orthogonal to the rotation axis, intersects with the axial bearing, and is between the other two sets of planes.

Therefore, relative to the usual arrangement, the first radial displacement sensors are shifted in position to the far side of at least part of the axial bearing if viewed from the first radial bearing. This enables a simplified construction of shorter length and smaller weight requiring less space, yielding a higher sensitivity and thus better control.

In an advantageous embodiment, the axial bearing provides a void space, and the first radial displacement sensors extend into the void space of the axial bearing.

The bearing device may further comprise a drive motor. Then it is advantageous if the drive motor is arranged between the first and second active radial bearing, and if the second radial displacement sensors are arranged between the second active radial bearing and the drive motor if viewed in an orthogonal projection onto the rotation axis.

For active control, the device may further comprise one or more axial displacement sensors and one or more sensors for detecting the angular velocity. An advantageous construction of the bearing device results if the first radial displacement sensors and the axial displacement sensors are integrated in a single multiple-sensing unit. Preferably also the angular velocity sensors are integrated into the multiple-sensing unit.

It is a further object of the present invention to provide a pump, in particular a turbo-molecular pump, with reduced size and weight and improved stability. This object is achieved by a pump, in particular a turbo-molecular pump, comprising a magnetic bearing device and a rotor rotatably supported in the magnetic bearing device, characterized in that the magnetic bearing device is a magnetic bearing device, the magnetic bearing device comprising a first active radial bearing, one or more first radial displacement sensors, and an axial bearing, characterized in that at least a part of the axial bearing is disposed between the first active radial bearing and the first radial displacement sensors if viewed in an orthogonal projection onto the rotation axis.

It is still a further object of the present invention to provide a means which enables simultaneous determination of several characteristics of a rotating shaft while requiring reduced space and providing simplified cabling. This object is achieved by a multiple-sensing unit for a magnetic bearing device, the magnetic bearing device comprising a first active radial bearing, one or more first radial displacement sensors, and an axial bearing, characterized in that at least a part of the axial bearing is disposed between the first active radial bearing and the first radial displacement sensors if viewed in an orthogonal projection onto the rotation axis, for determining characteristics of a rotor of a pump, the multiple-sensing unit comprising a holding member and a plurality of sensors attached to the holding member, wherein at least one of the sensors is a radial displacement sensor and at least one of the sensors is an axial displacement sensor. Thus, the multiple-sensing unit comprises a holding member and a plurality of sensors attached to the holding member, wherein at least one of the sensors is a radial displacement sensor and at least one of the sensors is an axial displacement sensor. Preferably, also at least one angular velocity sensor is integrated in the multiple-sensing unit; thus, preferably at least one of the sensors is an angular velocity sensor. Such a sensor can be a pulse sensor or a so-called resolver, both types well known in the art.

Such a multiple-sensing unit is advantageous since it allows several sensors to be integrated in a single unit which can easily be put in place during manufacture of the device, and which is easily replaceable as a whole. For this, the multiple-sensing unit advantageously has a single connector for all electrical connections to the sensors.

The multiple-sensing unit is preferably constructed in such a way that, when it adopts its final position in the magnetic bearing device, at least part of the axial bearing unit is disposed between the first radial bearing unit and the multiple-sensing unit if viewed in an orthogonal projection onto the rotation axis.

Preferably, the holding member is adapted to be disposed in the magnetic bearing device such that it at least partially extends into a void space provided in the axial bearing.

BRIEF DESCRIPTION OF THE DRAWINGS

The invention will be described in more detail in connection with an exemplary embodiment illustrated in the drawings, in which.

DETAILED DESCRIPTION OF THE PREFERRED EMBODIMENT

Figure 1:
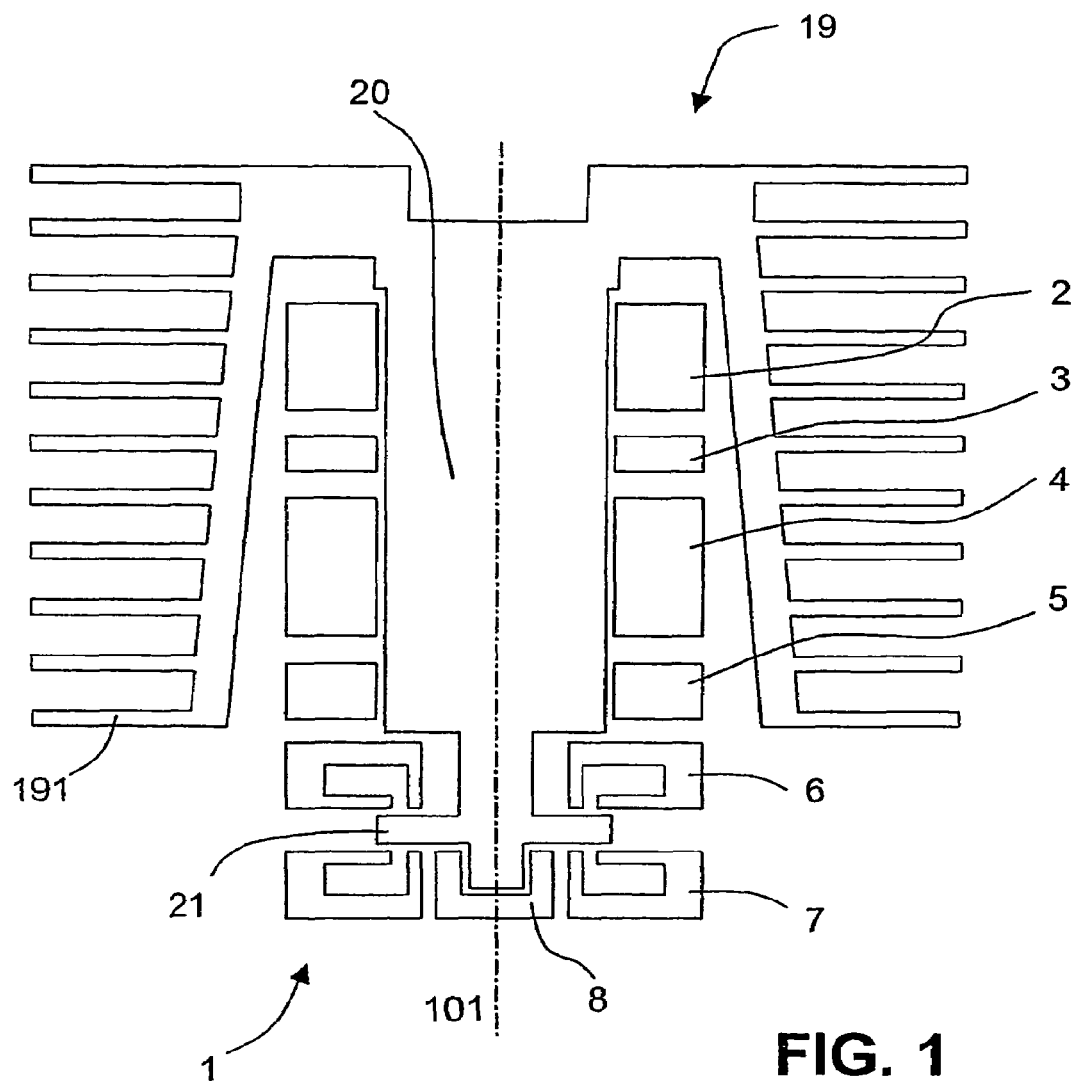
FIG. 1 shows a diagrammatic side sectional view of a turbo-molecular vacuum pump.

In FIG. 1, the arrangement of several key components of a turbo-molecular vacuum pump in an upright orientation is shown in a diagrammatic fashion. The pump may function in an arbitrary orientation in space; the shown upright orientation was chosen merely for illustrative purposes and for being able to better label certain parts. In the following, labels like "upper" and "lower", "top", and "bottom" will merely be introduced in order to make reference to positions in FIG. 1, without restricting their functioning in operation to such positions.

The pump comprises a magnetic bearing device 1 and a rotor 19 supported by the bearing device 1. The rotor 19 may rotate about an axis 101 and is supported in the bearing device by a vertical shaft 20. A plurality of pump blades 191, which partially surround the magnetic bearing device 1, are connected to the shaft 20 at its upper end. Near its lower end, a horizontal disk 21 is mounted to the shaft. The magnetic bearing device 1 comprises, in this order from top to bottom, an upper radial bearing unit 2, an upper sensing unit 3, a drive motor unit 4, a lower radial bearing unit 5, an upper axial bearing unit 6, a lower axial bearing unit 7, and a multiple-sensing unit 8. The multiple-sensing unit 8 extends into a void space between a lower end portion of the shaft and the lower axial bearing unit 7.

Figure 2:
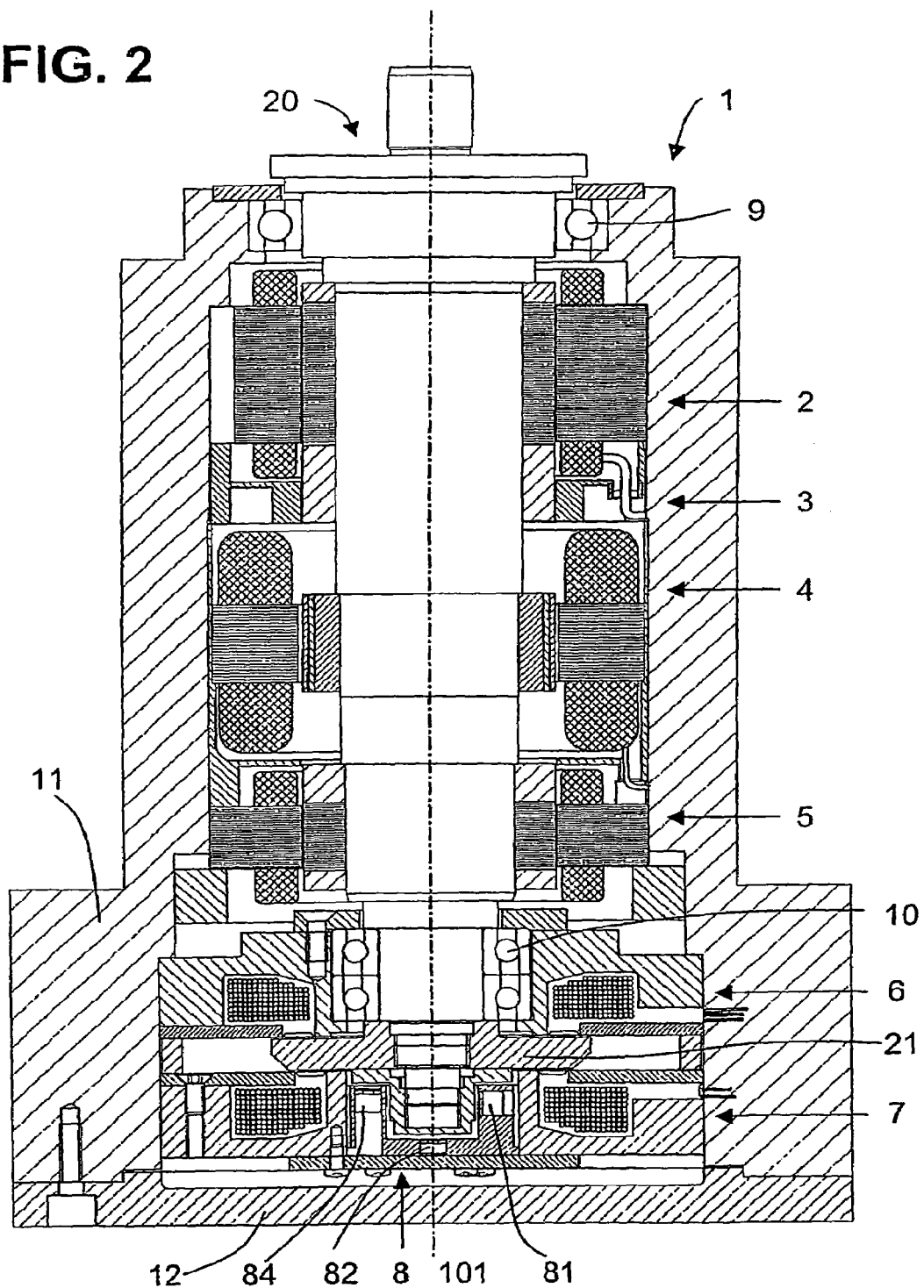
FIG. 2 shows a side sectional view of a bearing device with an inserted shaft.

The magnetic bearing device 1 together with the shaft 20 is shown in more detail in FIG. 2. Similar parts carry the same reference signs as in FIG. 1. In addition to the units already introduced in FIG. 1, a housing 11 and bottom plate 12 are shown, holding and protecting the magnetic bearing device. Near the top of the device, an upper touch-down (auxiliary) ball bearing 9 for catching the shaft during start-up or in emergency situations is disposed. A pair of lower touch-down ball bearings 10 is arranged in an annular void space between the shaft and the upper axial bearing unit 6. During normal operation of the pump, these touch-down ball bearings are not operational. In the multiple-sensing unit 8, several sensors are visible, specifically, a lower radial displacement sensor 81, an axial displacement sensor 82, and a reference sensor 84.

Figure 3:
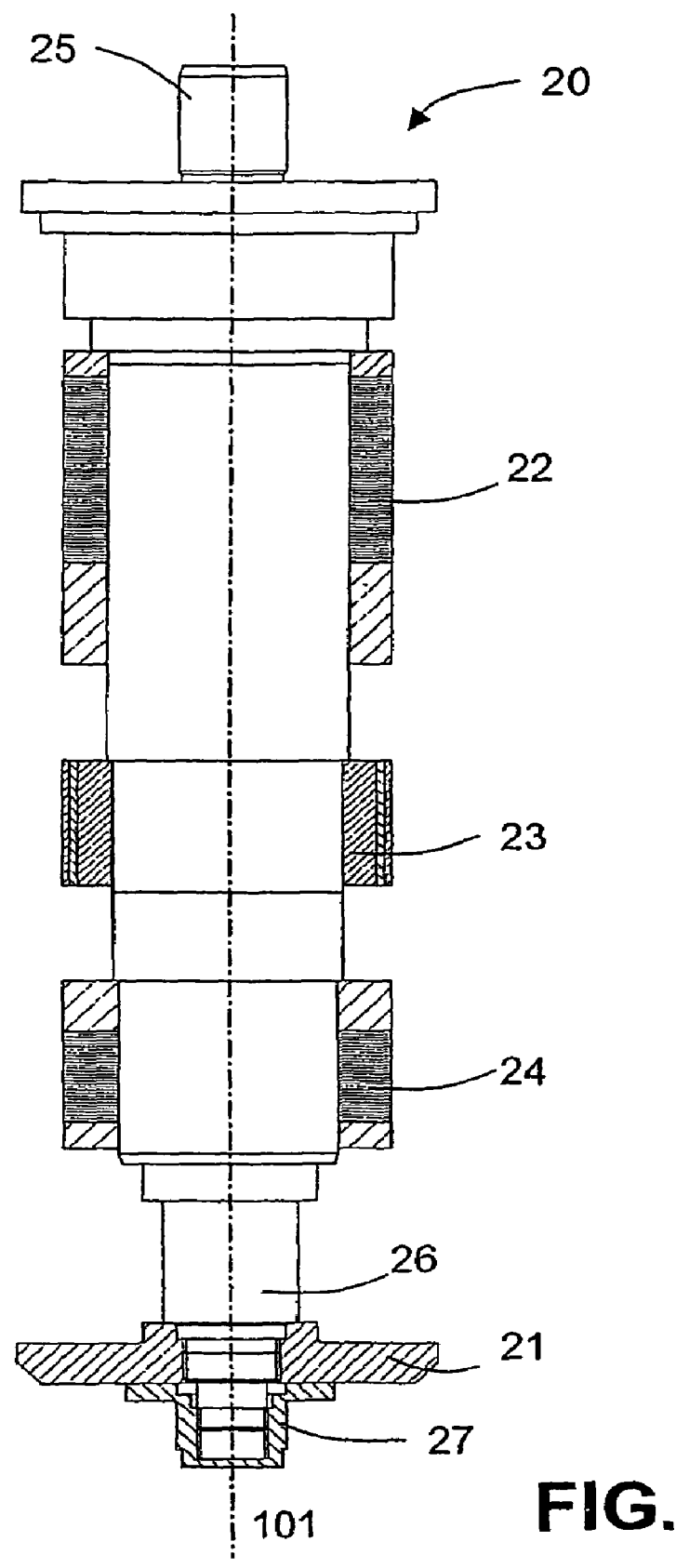
FIG. 3 shows a side sectional view of a shaft.

Taking reference to FIG. 3, a shaft 20 is shown by itself. The shaft 20 is generally of cylindrical symmetry, the symmetry axis 101 being the rotation axis. The shaft 20 has portions of varying diameters. A top portion 25 with a relatively small diameter is provided for attaching the pump blade assembly. From top to bottom, this is followed by several sections of larger diameters surrounded by ring-like structures 22, 23, 24 with defined magnetic properties, which, in operation, will interact with the radial magnetic bearing units and the drive motor unit, respectively. The bearing units and the drive motor unit thus serve as stators to which the ring-like structures form the rotor counterparts. The design of these ring-like structures is well known in the art and does not need to be discussed here. At a bottom portion 26 of the shaft with smaller diameter, the horizontal disk 21 is mounted with the aid of a nut 27, which in operation will extend into the multiple-sensing unit 8 and which is adapted to interact with the sensors disposed in that unit.

The individual units of the magnetic bearing device will now be described in more detail with reference to FIGS. 4-11.

Figure 4:
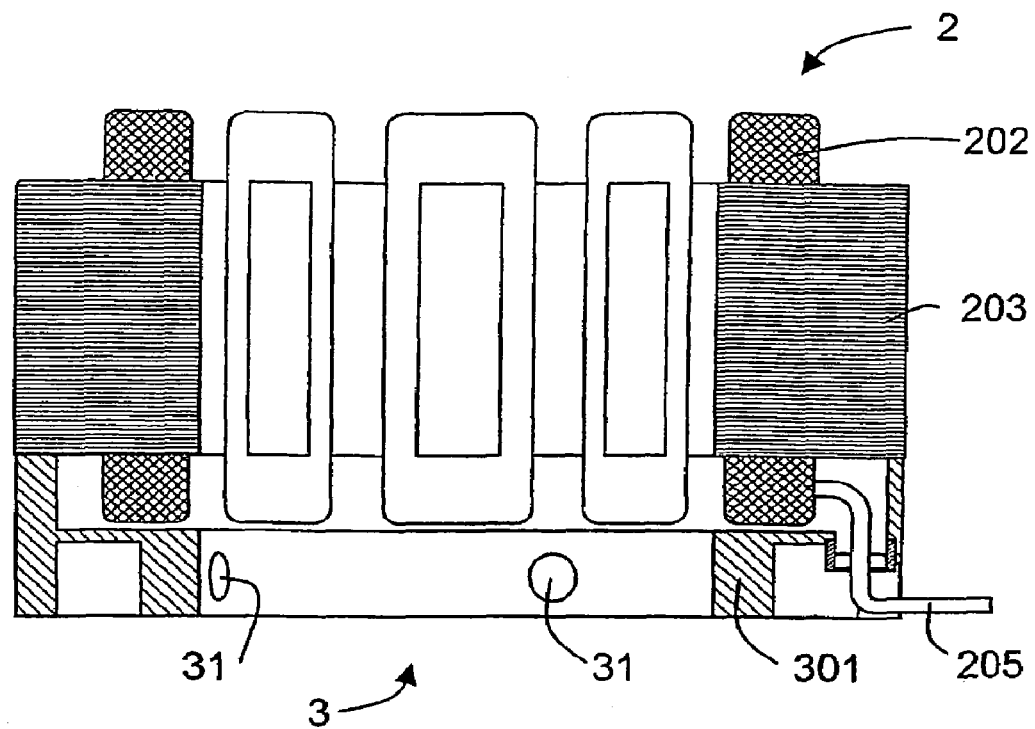
FIG. 4 shows, on an enlarged scale, a side sectional view of an upper radial bearing unit together with an upper sensing unit.

FIG. 4 shows, on an enlarged scale, a side sectional view of an upper radial bearing unit 2, below which an upper sensing unit 3 is attached. Both units are of a roughly annular shape, with a cylindrical central bore along the rotation axis through which the shaft 20 extends in operation. The upper bearing unit comprises a plurality of electromagnets made from coils 202 wound around magnetic cores 203. In FIG. 4, eight such coils are arranged in equal distances around the circumference of the bore; while using eight coils is advantageous, the number is not critical, e.g., only four or even three coils may be used. Wires 205 are connected to the coils for supplying them with electric currents. In operation, such currents cause magnetic fields to be created by the coils, which in turn lead to radial forces between the radial bearing unit 2 and the upper portion of the shaft 20.

Figure 5:
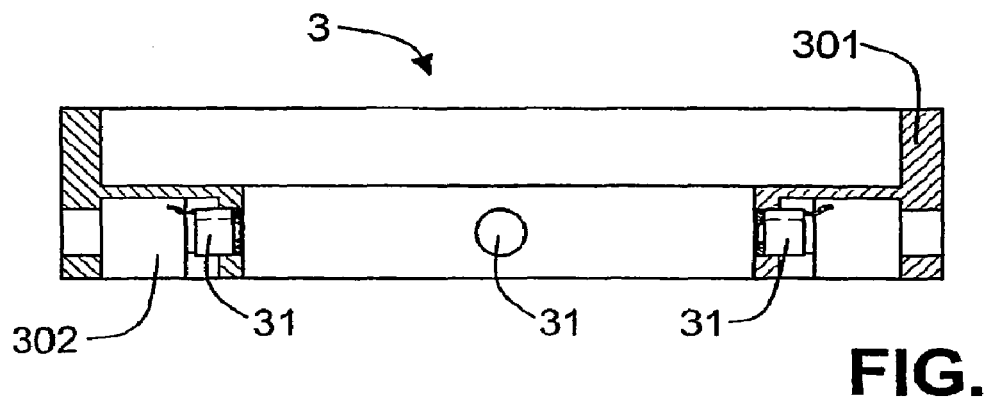
FIG. 5 shows, on an enlarged scale, a side sectional view of an upper sensing unit.

The upper sensing unit 3 is shown in FIG. 5 in a different side sectional view, with the cross-sectional (viewing) plane rotated by 22,5° about the rotation axis with respect to FIG. 4. The unit 3 comprises a holding member 301 designed to cooperate with the upper radial bearing unit 2. In radial openings of the holding member 301, four radial displacement sensors 31 are disposed in equal distances around the circumference of the bore. An annular void 302 is present in the holding member in which wires for operating the sensors 31 are guided. While it is advantageous to supply four radial displacement sensors, this number is again not critical. By providing a pair of sensors for each of two orthogonal radial directions and operating each pair differentially, sensor response can be linearized, temperature drift can be compensated, and sensitivity can be increased. Each sensor 31 is constructed like a tiny electromagnet, i.e., it comprises a coil wound around a magnetic or non-magnetic core. The distance from each sensor 31 to the shaft is monitored by monitoring the inductance changes of the coil or induced voltages resulting from variations of the distance between the sensor and the shaft or an annular structure mounted on the shaft. Either an inductance effect, an eddy current effect or both effects simultaneously are utilized for sensing.

Figure 6:
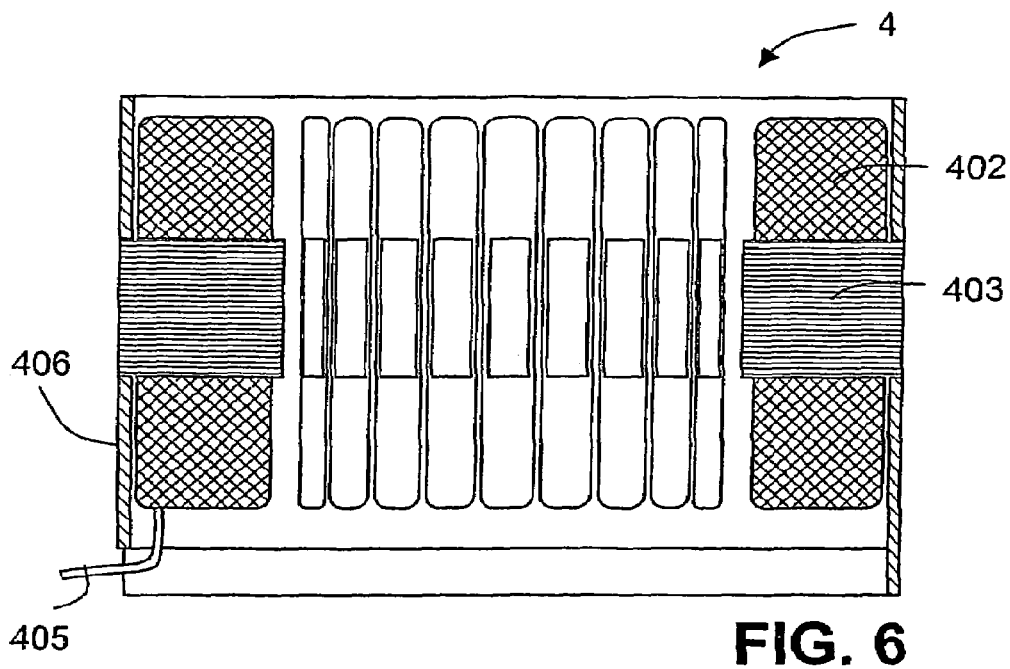
FIG. 6 shows, on an enlarged scale, a side sectional view of a drive motor unit.

In FIG. 6, a side sectional view of a drive motor unit 4 is shown. The drive motor unit 4 forms the stator part of the motor driving the rotation of the rotor 19. It comprises magnetic cores 403 with coils 402 and wires 405 for current supply. The unit is held in place by a motor housing 406, which cooperates with the lower radial bearing unit 5. Operation of such a drive motor unit is well known in the art and need not be discussed here.

Figure 7:
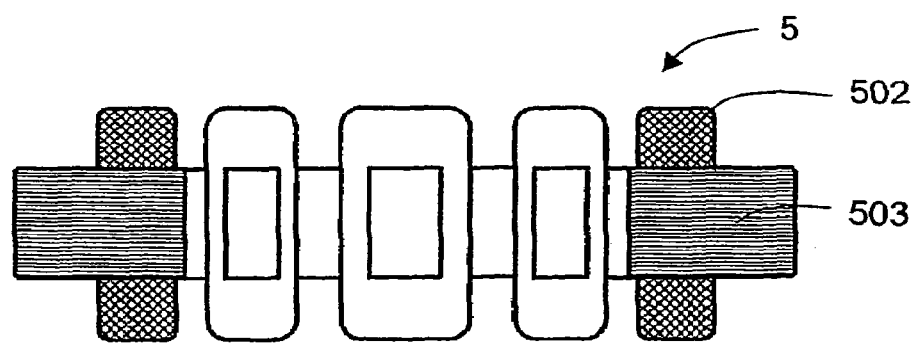
FIG. 7 shows, on an enlarged scale, a side sectional view of a lower radial bearing unit.

FIG. 7 shows a side sectional view of a lower radial bearing unit 5. It is similarly constructed as the upper radial bearing unit 2 and has the same principle of operation. It can, however, be somewhat shorter than the upper radial bearing unit 2, as the forces to be compensated by the unit 5 are generally somewhat smaller than those of the unit 2. Eight coils 502 are wound around magnetic cores 503, where the number of coils is again not critical.

Figure 8:
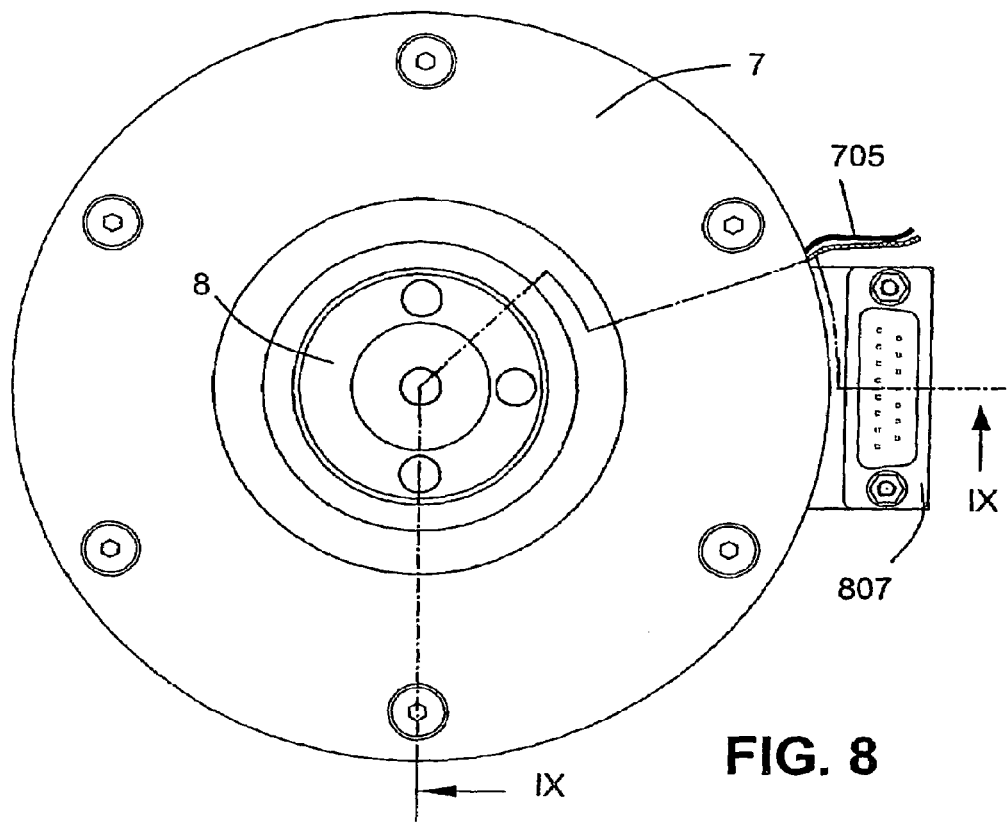
FIG. 8 shows, on a different scale, a top view of a lower axial bearing unit together with a multiple-sensing unit, illustrating the cross-sectional plane IX-IX.

In FIG. 8, a top view of a lower axial bearing unit 7 is shown, to which a multiple-sensing unit 8 is attached. Wires 705 for supplying currents to the lower axial bearing unit 7, and a connector 807 for establishing electrical connections to the sensors contained in the multiple-sensing unit 8 can be seen. A cross-sectional plane IX-IX is indicated by dash-dotted lines.

Figure 9:
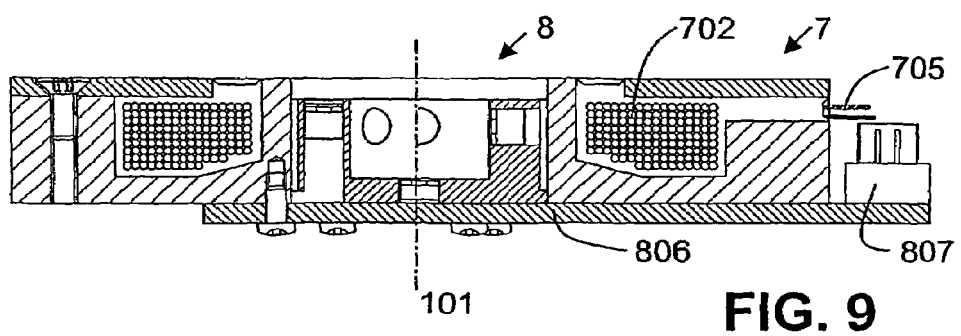
FIG. 9 shows a sectional view of a lower axial bearing unit together with a multiple-sensing unit in the plane IX-IX.

FIG. 9 shows a schematic sectional view of the lower axial bearing unit 7 together with multiple-sensing unit 8, viewed in the cross-sectional plane IX-IX of FIG. 8. The lower axial bearing unit 7 serves as part of the stator of the axial bearing. It comprises a coil 702 wound horizontally such that the coil axis coincides with the rotation axis 101. Wires 705 extend to the outside of the axial bearing unit 7 for supplying currents to the coil 702. The unit has a vertical central bore, in which the multiple-sensing unit 8 is disposed.

Figure 10:
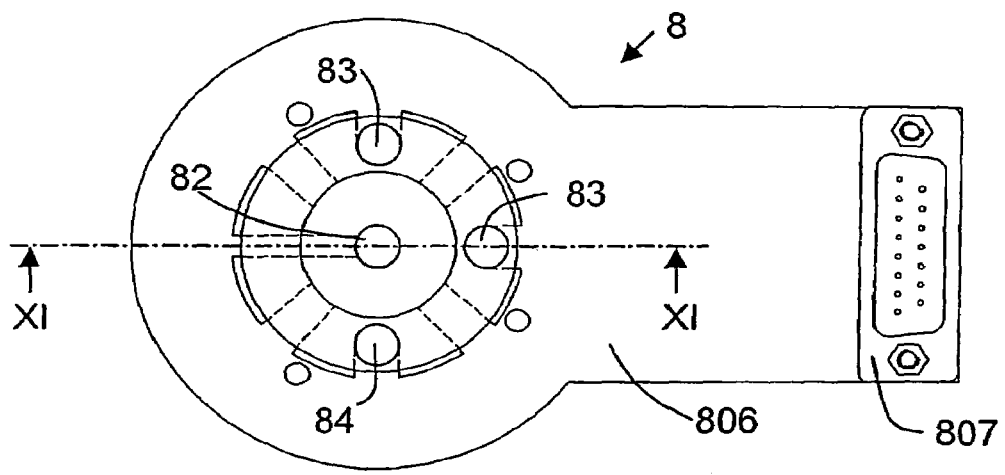
FIG. 10 shows a top view of a multiple-sensing unit.
Figure 11:
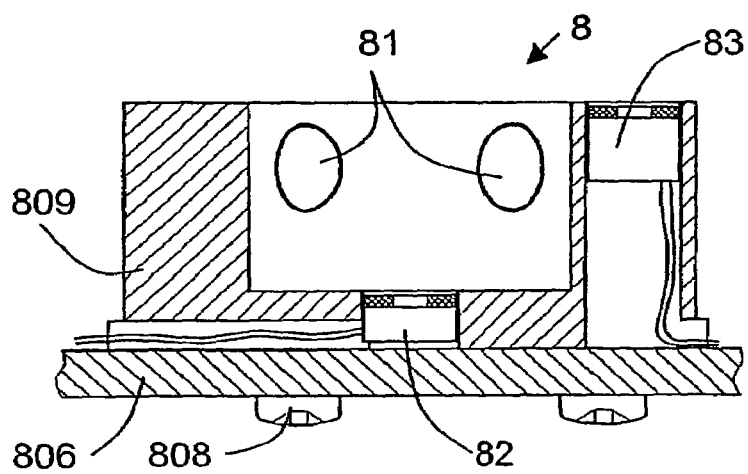
FIG. 11 shows, on an enlarged scale, a side sectional view of a multiple-sensing unit.

The multiple-sensing unit 8 is shown by itself in a top plan view in FIG. 10. A cross-sectional plane XI-XI is indicated by dash-dotted lines in FIG. 10. FIG. 11 shows a sectional view in this plane.

The multiple-sensing unit 8 is supported by a bottom plate 806, which, at the same time, serves as a printed circuit board (PCB) with electrical connections to the connector 807 at the periphery of the bottom plate 806. The unit comprises a holding member 809 with a central cylindrical opening for taking up the bottom end of the shaft 20. The holding member 809 is constructed such that it can house a number of sensors. In the present embodiment, four lower radial displacement sensors 81, one axial displacement sensor 82, two angular velocity sensors 83, and one reference sensor 84 are housed in the holding member 809. All sensors are of the electromagnetic type described above. The lower radial displacement sensors 81 are arranged along the circumference of the cylindrical opening, facing the cylindrical surface of the opening. Their mode of operation is the same as for the upper radial displacement sensors 31. The axial displacement sensor 82 is arranged immediately below the central cylindrical opening of the holding member 809, facing the opening. It detects axial displacements of the shaft 20 in a similar way as the detection of radial displacements by the radial displacement sensors. Since for the axial sensor a pair-wise arrangement enabling differential operation, as employed with the radial sensors, is not possible, a reference (dummy) sensor 84 facing a fixed target is also disposed in the holding member 809 for temperature drift compensation of the axial displacement sensor. The two angular velocity sensors 83 are arranged near the margin of the holding member, oriented such that they face the horizontal disk 21 attached to the shaft 20 in operation. They are used for detecting the frequency and direction of rotation with the aid of a notch in the horizontal disk 21.

An essential aspect of the present magnetic bearing device 1 can best be seen by reverting to FIG. 1. Near the lower end of the magnetic bearing device 1, the upper and lower axial bearing units 6 and 7, respectively, together form the stator of an axial bearing. Together with the horizontal disk 21, an axial bearing is formed. The lower radial bearing unit 5 provides the stator of a first radial bearing. Together with its rotor counterpart on the shaft 20, a radial bearing is formed. The lower radial displacement sensors 81 which are embedded in the multiple-sensing unit 8 form a set of first radial displacement sensors. They are arranged in such a way that the upper axial bearing unit 6, i.e., a part of the axial bearing, is disposed between the first radial bearing and the first radial displacement sensors if viewed in an orthogonal projection onto the rotation axis.

In contrast, in the prior art, the lower radial displacement sensors have normally been arranged as close as possible to the corresponding lower bearing in order to obviate or minimize the need for mathematically transforming the sensor signals before being able to use them for controlling the bearings. It has therefore been avoided in the art to remove a sensor from the corresponding bearing, because it has been thought that this would cause instability of the control.

The present invention clearly shows that this is not the case. Indeed, control is even improved, since the distance between the upper and lower radial displacement sensors 31 and 81, respectively, is increased. A large distance yields optimum sensitivity for distinguishing whole-body translational motions from tilting motions, enabling better control for the two types of motion. This improved sensitivity comes at the price of a need to mathematically transform the signals from the sensors before they can be used in feedback control. This, however, is not a significant problem if advanced control circuitry is used, as is available at low cost nowadays. This is especially true if digital circuitry is used. The necessary transformations can then be easily executed on a digital signal processor. The mathematical transformations as such are well known in the art and involve standard linear algebra only.

By moving the lower radial displacement sensors into the immediate vicinity of the axial displacement sensor and the angular velocity sensors, a conceptual simplification is achieved: In the inventive design only two instead of three distinct sensor locations are present along the shaft axis. One of the locations is the region in which the upper (second) radial displacement sensors are arranged, while the other location contains essentially all other sensors. The wires leading to the sensors of each location may be bundled, and therefore cabling becomes easier.

Additionally, by moving the lower radial displacement sensors 81 to the bottom of the bearing device, use can be made of the void space in the lower axial bearing unit 7 which in the prior art has remained largely unused. Thus, the first radial displacement sensors 81 extend into the void space.

In the new design, several sensor types (radial displacement sensors 81, axial displacement sensor 82, angular velocity sensors 83, reference sensor 84, etc.) are integrated into a single multiple-sensing unit 8. This makes manufacturing the product significantly simpler. Also cabling becomes once more simpler, since the whole multiple-sensing unit needs only a single connector mounted on the PCB.

By placing the lower radial displacement sensors 81 into a void of the lower axial bearing, between the shaft 20 and the lower axial bearing unit 7, the bearing device 1 and the shaft 20 can be built with shorter length than in the prior art. Thereby also the overall masses of the device and of the shaft are reduced. Because of the reduced mass of the shaft, smaller electromagnets may be used in the bearings and in the drive stator, further reducing the weight and size of the device. The shorter length of the shaft furthermore leads to increased eigenfrequencies of the rotor, which makes control easier.

In another aspect, the present invention also shows that it is possible to dispose the second (upper) radial displacement sensors 31 embedded in the upper sensing unit 3 between the second active radial bearing unit 2 and the drive motor unit 4. This brings the upper radial displacement sensors 31 into the immediate vicinity of the drive motor coils 402.

In contrast, in the prior art, upper radial displacement sensors have normally been arranged at or near the top of the bearing device, followed, from top to bottom, by upper radial bearings, a drive motor stator, lower radial bearings, lower radial displacement sensors, axial bearings, and an axial displacement sensor. There has been a clear rationale for such an arrangement: By placing the upper and lower radial displacement sensors away from the drive motor stator coils, disturbances of the sensors by the drive currents were supposedly minimized.

The present invention shows that such disturbances do not need to impede control even when the sensors are close to the drive motor coils. The problem of potential disturbances is more than compensated by advantages. By placing the upper radial displacement sensors 31 next to the drive motor stator unit 4, the upper radial bearing unit 2 can be moved up to a place near the top of the bearing device. This has the advantage that a larger distance is present between the upper and lower radial bearings without increasing the length of the device as a whole. Due to the larger leverage effect, smaller forces are needed in the bearings for exerting a certain moment of force on the shaft. The inevitable shortening of the distance between the upper and lower radial displacement sensors 31 and 81, respectively, can well be tolerated in the present design because the lower radial displacement sensors 81 are already at the very bottom of the bearing device, and therefore sensitivity is not significantly compromised.

In the foregoing discussion, all sensors 31, 81, 82, 83, and 84 have always been described as being of the electromagnet-type, with a small coil wound around a magnetic core. Of course, also other suitable sensor types may be used. One important example for a different sensor type, which may lead to an even further reduced size of the magnetic bearing device, is disclosed in the European Patent Application No. 02 406 013.9 entitled "Device for contact-less measurement of distances in multiple directions" of the same applicant. In that application, a device for contact-less measurements of distances in multiple directions of a ferromagnetic or conductive body is disclosed. A plurality of inductive elements is provided, of which at least one is placed essentially around the body. The other inductive elements are provided in the vicinity of that element. All these elements can be integrated on a single printed circuit board. Such a device is operated by supplying a radio-frequency (rf) current to the inductive element which is placed around the body. Displacements of the body change the rf magnetic field at the locations of the other inductive elements and thus the induced rf voltages in these elements. Thus, with a single printed circuit board, a sensor can be constructed which is able to sense displacements in several directions. Such sensors can be employed advantageously in the present magnetic bearing device, in particular as a first (lower) or second (upper)1 radial displacement sensor. By integrating these sensors on thin printed circuit boards, the length of the bearing device can be even further reduced.

The invention claimed is:

1. A magnetic bearing device for rotatably supporting a rotor for rotation about a rotation axis, the magnetic bearing device comprising:
    a first active radial bearing;
    a second active radial bearing;
    at least one first radial displacement sensor; and
    an axial bearing, wherein at least a part of the axial bearing is disposed between the first active radial bearing and the at least one first radial displacement sensor when viewed in an orthogonal projection onto the rotation axis, and wherein the first active radial bearing is disposed between the axial bearing and the second active radial bearing when viewed in an orthogonal projection onto the rotation axis.

2. The magnetic bearing device according to claim 1, wherein the magnetic bearing device further comprises a drive motor and second radial displacement sensors, wherein the drive motor is disposed between the first active radial bearing and the second active radial bearing when viewed in an orthogonal projection onto the rotation axis, and wherein the second radial displacement sensors are arranged between the second active radial bearing and the drive motor when viewed in an orthogonal projection onto the rotation axis.

3. The magnetic bearing device according to claim 1, wherein the axial bearing provides a void space and wherein the at least one first radial displacement sensor extends into the void space of the axial bearing.

4. The magnetic bearing device according to claim 1, wherein the magnetic bearing device further comprises at least one axial displacement sensor, and wherein the at least one first radial displacement sensor and the at least one axial displacement sensor are integrated in a single multiple-sensing unit.

5. The magnetic bearing device according to claim 1, further comprising one or more angular velocity sensors integrated in the multiple-sensing unit.

6. A vacuum pump, comprising:
a magnetic bearing device; and
a rotor rotatably supported in the magnetic bearing device, wherein the magnetic bearing device comprises:
a first active radial bearing;
a second active radial bearing;
at least one first radial displacement sensor; and
an axial bearing,
wherein at least a part of the axial bearing is disposed between the first active radial bearing and the at least one first radial displacement sensor when viewed in an orthogonal projection onto the rotation axis, and
wherein the first active radial bearing is disposed between the axial bearing and the second active radial bearing when viewed in an orthogonal projection onto the rotation axis.

7. The magnetic bearing device according to claim 1, further comprising a multiple-sensing unit, the multiple-sensing unit comprising:
a holding member; and
a plurality of sensors attached to the holding member, wherein at least one of the sensors is a radial displacement sensor and at least one of the sensors is an axial displacement sensor.

8. The magnetic bearing device according to claim 7, wherein the holding member is disposed in the magnetic bearing device such that at least a part of the axial bearing is disposed between the first active radial bearing and the multiple-sensing unit when viewed in an orthogonal projection onto the rotation axis.

9. The magnetic bearing device according to claim 7, wherein the holding member at least partially extends into a void space provided in the axial bearing.

10. The magnetic bearing device according to claim 7, wherein at least one of the sensors comprised by the multiple-sensing unit is an angular velocity sensor.

11. The vacuum pump according to claim 6, wherein the vacuum pump is a turbo molecular vacuum pump.

* * * * *